(12) United States Patent
Tian et al.

(10) Patent No.: US 11,489,904 B2
(45) Date of Patent: Nov. 1, 2022

(54) POOR-QOE ASSESSMENT METHOD AND RELATED DEVICE

(71) Applicant: HUAWEI TECHNOLOGIES CO., LTD., Guangdong (CN)

(72) Inventors: Jiaming Tian, Nanjing (CN); Qingping Yang, Nanjing (CN); Chuntao Wang, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/320,497

(22) Filed: May 14, 2021

(65) Prior Publication Data

US 2021/0360050 A1 Nov. 18, 2021

(30) Foreign Application Priority Data

May 15, 2020 (CN) .......................... 202010414492.4

(51) Int. Cl.
*H04L 29/06* (2006.01)
*H04L 12/26* (2006.01)
(Continued)

(52) U.S. Cl.
CPC ............ *H04L 65/80* (2013.01); *H04L 41/145* (2013.01); *H04L 43/0882* (2013.01); *H04L 47/2441* (2013.01); *H04L 47/2483* (2013.01)

(58) Field of Classification Search
CPC ... H04L 65/80; H04L 41/145; H04L 43/0882; H04L 47/2441; H04L 47/2483
See application file for complete search history.

(56) References Cited

U.S. PATENT DOCUMENTS

| 10,609,206 B1 | 3/2020 | Dannamaneni et al. |
| 2011/0093902 A1* | 4/2011 | De Los Reyes .... H04L 12/2838 370/352 |

(Continued)

FOREIGN PATENT DOCUMENTS

| CN | 107105224 A | 8/2017 |
| CN | 107733705 A | 2/2018 |

(Continued)

OTHER PUBLICATIONS

Hsu Wu-Hsiao et al: "Web-Based QoE Measurement Framework", 2013 International Conference on Signal-Image Technology and Internet-Based Systems, IEEE, Dec. 2, 2013 (Dec. 2, 2013), pp. 265-272, XP032561386,Total 8 Pages.

(Continued)

*Primary Examiner* — Abdulkader M Alriyashi
(74) *Attorney, Agent, or Firm* — Womble Bond Dickinson (US) LLP

(57) ABSTRACT

A poor-QoE assessment method and a related device are provided. The method includes: obtaining m data streams transmitted by a network device; screening the m data streams, and determining that p data streams in the m data streams and that meet a first preset condition are data streams corresponding to a first type; performing feature extraction on the data streams corresponding to the first type, to obtain known feature vectors corresponding to the first type; training, by using the known feature vectors corresponding to the first type, an untrained first poor-QoE assessment model, to obtain a trained first poor-QoE assessment model; and performing, by using the trained first poor-QoE assessment model, poor-QoE assessment on n data streams corresponding to the first type, to obtain a first poor-QoE assessment result. This method can be universally used instead of an application.

15 Claims, 5 Drawing Sheets

(51) Int. Cl.
*H04L 12/851* (2013.01)
*H04L 12/24* (2006.01)
*H04L 65/80* (2022.01)
*H04L 41/14* (2022.01)
*H04L 43/0882* (2022.01)
*H04L 47/2441* (2022.01)
*H04L 47/2483* (2022.01)

(56) References Cited

U.S. PATENT DOCUMENTS

2018/0197089 A1\* 7/2018 Krasser ............... G06N 3/0445
2019/0037270 A1\* 1/2019 Arpirez Vega ... H04N 21/64723
2019/0222491 A1   7/2019 Tomkins et al.

FOREIGN PATENT DOCUMENTS

CN   110362772 A   10/2019
EP     2362599 A1   8/2011

OTHER PUBLICATIONS

Aguiar Elisangela et al: "A real-time video quality estimator for emerging wireless multimedia systems", Wireless Networks, ACM, 2 Penn Plaza, Suite 701—New YorkUSA,vol. 20, No. 7, Mar. 6, 2014 (Mar. 6, 2014), pp. 1759-1776,XP035393253,,Total 18 Pages.

\* cited by examiner

POOR-QOE ASSESSMENT METHOD AND RELATED DEVICE

CROSS-REFERENCE TO RELATED APPLICATION

This application claims priority to Chinese Patent Application No. 202010414492.4, filed on May 15, 2020, which is hereby incorporated by reference in its entirety.

TECHNICAL FIELD

This application relates to the field of internet application technologies, and in particular, to a poor-QoE assessment method and a related device.

BACKGROUND

With rapid development of internet technologies, various terminal applications emerge. To ensure quality of experience (QoE) of the application, a network operator needs to manage application traffic. For example, the network operator detects the QoE of the application, performs fault locating and demarcation on an experience-type problem of the application, and schedules a network resource to ensure a service level of a key application. Therefore, the management on the application traffic in a network has become one of important issues to which the network operator pays attention. Poor-QoE assessment and analysis on the application are critical for the network operator to manage the application traffic.

However, an existing poor-QoE assessment method is not universally used.

SUMMARY

This application provides a poor-QoE assessment method and a related device, which can be used to perform poor-QoE assessment on a same type of applications instead of an application, and can be universally used.

According to a first aspect, this application provides a poor-QoE assessment method, where the method is applied to a network device. The method includes:

obtaining m data streams, where the m data streams are data streams transmitted by the network device, and m is a natural number greater than 1;

screening the m data streams, and determining that p data streams that are in the m data streams and that meet a first preset condition are data streams corresponding to a first type, where p is a natural number greater than 0;

performing feature extraction on the data streams corresponding to the first type, to obtain known feature vectors corresponding to the first type;

training, by using the known feature vectors corresponding to the first type, an untrained first poor-QoE assessment model, to obtain a trained first poor-QoE assessment model; and performing, by using the trained first poor-QoE assessment model, poor-QoE assessment on n data streams corresponding to the first type, to obtain a first poor-QoE assessment result, where the n data streams are data streams after the m data streams transmitted by the network device, and n is a natural number greater than 0.

In some possible embodiments, the performing, by using the trained first poor-QoE assessment model, poor-QoE assessment on n data streams includes:

performing feature extraction on the n data streams, to obtain to-be-assessed feature vectors corresponding to the first type; and inputting the to-be-assessed feature vectors corresponding to the first type into the trained first poor-QoE assessment model to perform the poor-QoE assessment, to obtain the first poor-QoE assessment result.

In some possible embodiments, the m data streams are data streams $M_1, M_2, \ldots,$ and $M_t$ that are transmitted by the network device within t time periods, and t is a natural number greater than 1; before the screening the m data streams, and determining that p data streams that are in the m data streams and that meet a first preset condition are data streams corresponding to a first type, the method further includes:

obtaining t bandwidth utilization rates $U_1, U_2, \ldots,$ and $U_t$ corresponding to the t time periods, t average throughputs $W_1, W_2, \ldots,$ and $W_t$ corresponding to the t time periods, and percentiles corresponding to the t average throughputs $W_1, W_2, \ldots,$ and $W_t$; and the screening the m data streams, and determining that p data streams that are in the m data streams and that meet a first preset condition are data streams corresponding to a first type includes:

identifying the m data streams, and determining one or more application types to which the m data streams belong;

correspondingly screening out, from the m data streams, data streams $M_1', M_2', \ldots,$ and $M_t'$ corresponding to a target application type, where the target application type is any one of the one or more application types to which the m data streams belong;

when a bandwidth utilization rate $U_i$ is greater than a first preset threshold, determining a time period corresponding to an average throughput that is greater than a first preset percentile and that is in the t average throughputs $W_1, W_2, \ldots,$ and $W_t$ as a target time period, and determining a data stream that is in the data streams $M_1', M_2', \ldots,$ and $M_t'$ corresponding to the target application type and that is corresponding to the target time period as a data stream $M_i''$ corresponding to the first type, where i is a natural number, and $1 \leq i \leq t$;

when the bandwidth utilization rate $U_i$ is less than or equal to the first preset threshold and greater than a second preset threshold, determining a time period corresponding to an average throughput that is greater than a second preset percentile and that is in the t average throughputs $W_1, W_2, \ldots,$ and $W_t$ as the target time period, and determining the data stream that is in the data streams $M_1', M_2', \ldots,$ and $M_t'$ corresponding to the target application type and that is corresponding to the target time period as the data stream $M_i''$ corresponding to the first type; and when the bandwidth utilization rate $U_i$ is less than or equal to the second preset threshold, determining a time period corresponding to an average throughput that is greater than a third preset percentile and that is in the t average throughputs $W_1, W_2, \ldots,$ and $W_t$ as the target time period, and determining the data stream that is in the data streams $M_1', M_2', \ldots,$ and $M_t'$ corresponding to the target application type and that is corresponding to the target time period as the data stream $M_i''$ corresponding to the first type, where 0<the second preset threshold<the first preset threshold, and 0<the first preset percentile<the second preset percentile<the third preset percentile<100.

In some possible embodiments, after the screening the m data streams, the method further includes:

determining that q data streams that are in the m data streams and that meet a second preset condition are data streams corresponding to a second type, where all data streams in the q data streams are different from data streams in the p data streams, q is a natural number greater than 0, and p+q≤m;

performing feature extraction on the data streams corresponding to the second type, to obtain known feature vectors corresponding to the second type;

training, by using the known feature vectors corresponding to the second type, an untrained second poor-QoE assessment model, to obtain a trained second poor-QoE assessment model; and performing, by using the trained second poor-QoE assessment model, poor-QoE assessment on w data streams corresponding to the second type, to obtain a second poor-QoE assessment result, where the w data streams are data streams after the m data streams transmitted by the network device, and w is a natural number greater than 0.

In some possible embodiments, the network device includes at least one untrained one poor-QoE assessment model, each of the at least untrained one poor-QoE assessment model is corresponding to one application type, the untrained first poor-QoE assessment model is any one of the at least one untrained poor-QoE assessment model, and the untrained first poor-QoE assessment model is corresponding to the target application type.

In the foregoing solution, the network device can perform, by using the trained first poor-QoE assessment model, the poor-QoE assessment on the n data streams corresponding to the first type (namely, the target application type) transmitted by the network device, to obtain the first poor-QoE assessment result, and is not limited to performing poor-QoE assessment on an application. This solution resolves a problem that in an existing poor-QoE assessment method, poor-QoE assessment can be performed only on an application, but cannot be performed on a same type of applications. This solution can be universally used. In addition, it may further be learned that the trained first poor-QoE assessment model is obtained by training the untrained first poor-QoE assessment model by using a data stream corresponding to the first type and that is screened out from the m data streams. The trained first poor-QoE assessment model obtained by training the untrained first poor-QoE assessment model by using the screened data stream can be used to better perform the poor-QoE assessment on the n data streams that are corresponding to the first type and that are transmitted by the network device, and the obtained first poor-QoE assessment result can better help a network operator to schedule a service resource.

According to a second aspect, this application provides a poor-QoE assessment apparatus, where the apparatus is used in a network device. The apparatus includes:

an obtaining module, configured to obtain m data streams, where the m data streams are data streams transmitted by the network device, and m is a natural number greater than 1;

a screening module, configured to screen the m data streams, and determine that p data streams that are in the m data streams and that meet a first preset condition are data streams corresponding to a first type, where p is a natural number greater than 0;

a feature extraction module, configured to perform feature extraction on the data streams corresponding to the first type, to obtain known feature vectors corresponding to the first type;

a model training module, configured to train, by using the known feature vectors corresponding to the first type, an untrained first poor-QoE assessment model, to obtain a trained first poor-QoE assessment model; and a poor-QoE assessment module, configured to perform, by using the trained first poor-QoE assessment model, poor-QoE assessment on n data streams corresponding to the first type, to obtain a first poor-QoE assessment result, where the n data streams are data streams after the m data streams transmitted by the network device, and n is a natural number greater than 0.

In some possible embodiments, the poor-QoE assessment module is configured to:

perform feature extraction on the n data streams, to obtain to-be-assessed feature vectors corresponding to the first type; and input the to-be-assessed feature vectors corresponding to the first type into the trained first poor-QoE assessment model to perform the poor-QoE assessment, to obtain the first poor-QoE assessment result.

In some possible embodiments, the m data streams are data streams $M_1, M_2, \ldots,$ and $M_t$ that are transmitted by the network device within t time periods, and t is a natural number greater than 1; before screening the m data streams, and determining that the p data streams that are in the m data streams and that meet the first preset condition are the data streams corresponding to the first type, the obtaining module is further configured to:

obtain t bandwidth utilization rates $U_1, U_2, \ldots,$ and $U_t$ corresponding to the t time periods, t average throughputs $W_1, W_2, \ldots,$ and $W_t$ corresponding to the t time periods, and percentiles corresponding to the t average throughputs W1, W2, . . . , and Wt; and the screening module is configured to:

identify the m data streams, and determine one or more application types to which the m data streams belong;

correspondingly screen out, from the m data streams, data streams $M_1', M_2', \ldots,$ and $M_t'$ corresponding to a target application type, where the target application type is any one of the one or more application types to which the m data streams belong;

when a bandwidth utilization rate $U_i$ is greater than a first preset threshold, determine a time period corresponding to an average throughput that is greater than a first preset percentile and that is in the t average throughputs $W_1, W_2, \ldots,$ and $W_t$ as a target time period, and determine a data stream that is in the data streams $M_1', M_2', \ldots,$ and $M_t'$ corresponding to the target application type and that is corresponding to the target time period as a data stream $M_i''$ corresponding to the first type, where i is a natural number, and $1 \leq i \leq t$;

when the bandwidth utilization rate $U_i$ is less than or equal to the first preset threshold and greater than a second preset threshold, determine a time period corresponding to an average throughput that is greater than a second preset percentile and that is in the t average throughputs $W_1, W_2, \ldots,$ and $W_t$ as the target time period, and determine the data stream that is in the data streams $M_1', M_2', \ldots,$ and $M_t'$ corresponding to the target application type and that is corresponding to the target time period as the data stream $M_i''$ corresponding to the first type; and when the bandwidth utilization rate $U_i$ is less than or equal to the second preset threshold, determine a time period corresponding to an average throughput that is greater than a third preset percentile and that is in the t average throughputs $W_1, W_2, \ldots,$ and $W_t$ as the target time period, and determine the data stream that is in the data streams $M_1', M_2', \ldots,$ and $M_t'$ corresponding to the target application type and that is corresponding to the target time period as the data stream $M_t''$ corresponding to the first type, where 0<the second preset threshold<the first preset threshold, and 0<the first preset percentile<the second preset percentile<the third preset percentile<100.

In some possible embodiments, the screening module is further configured to determine that q data streams that are in the m data streams and that meet a second preset condition are data streams corresponding to a second type, where all data streams in the q data streams are different from data streams in the p data streams, q is a natural number greater than 0, and p+q≤m;

the feature extraction module is further configured to perform feature extraction on the data streams corresponding to the second type, to obtain known feature vectors corresponding to the second type;

the model training module is further configured to train, by using the known feature vectors corresponding to the second type, an untrained second poor-QoE assessment model, to obtain a trained second poor-QoE assessment model; and the poor-QoE assessment module is further configured to perform, by using the trained second poor-QoE assessment model, poor-QoE assessment on w data streams corresponding to the second type, to obtain a second poor-QoE assessment result, where the w data streams are data streams after the m data streams transmitted by the network device, and w is a natural number greater than 0.

In some possible embodiments, the network device includes at least one untrained poor-QoE assessment model, each of the at least one untrained poor-QoE assessment model is corresponding to one application type, the untrained first poor-QoE assessment model is any one of the at least one untrained poor-QoE assessment model, and the untrained first poor-QoE assessment model is corresponding to the target application type.

According to a third aspect, this application provides a network device. The network device includes a processor, a communications interface, and a memory. The memory is configured to store instructions, the processor is configured to execute the instructions, and the communications interface is configured to receive or send data. When executing the instructions, the processor performs the method described in the first aspect or any embodiment of the first aspect.

According to a fourth aspect, this application provides a computer storage medium. The computer storage medium stores a computer program, and when the computer program is executed by a processor, the method described in the first aspect or any embodiment of the first aspect is implemented.

According to a fifth aspect, this application provides a computer program product. When the computer program product is read and executed by a computer, the method described in the first aspect or any embodiment of the first aspect is implemented.

BRIEF DESCRIPTION OF DRAWINGS

The following describes accompanying drawings used in embodiments of this application.

DESCRIPTION OF EMBODIMENTS

To make objectives, technical solutions, and advantages of embodiments of the present disclosure more comprehensible, the following clearly describes the technical solutions in the embodiments of the present disclosure with reference to accompanying drawings in the embodiments of the present disclosure.

With rapid development of internet technologies, various terminal applications emerge. To ensure QoE of the application, a network operator needs to manage application traffic. For example, the network operator detects the QoE of the application, performs fault locating and demarcation on an experience-type problem of the application, and configures a network resource to ensure a service level of a key application. Therefore, the management on the application traffic in a network has become one of important issues to which the network operator pays attention to. Poor-QoE assessment and analysis on the application is critical for the network operator to manage the application traffic.

Currently, in most existing application poor-QoE assessment methods, information (such as network layer information and user equipment information) about an application is collected to train an algorithm, to obtain an assessment model dedicated to the application, and then the trained dedicated model is used to perform poor-QoE assessment on the application. However, the foregoing method is only applicable to perform poor-QoE assessment on a single application, and is not universally used.

Figure 1:
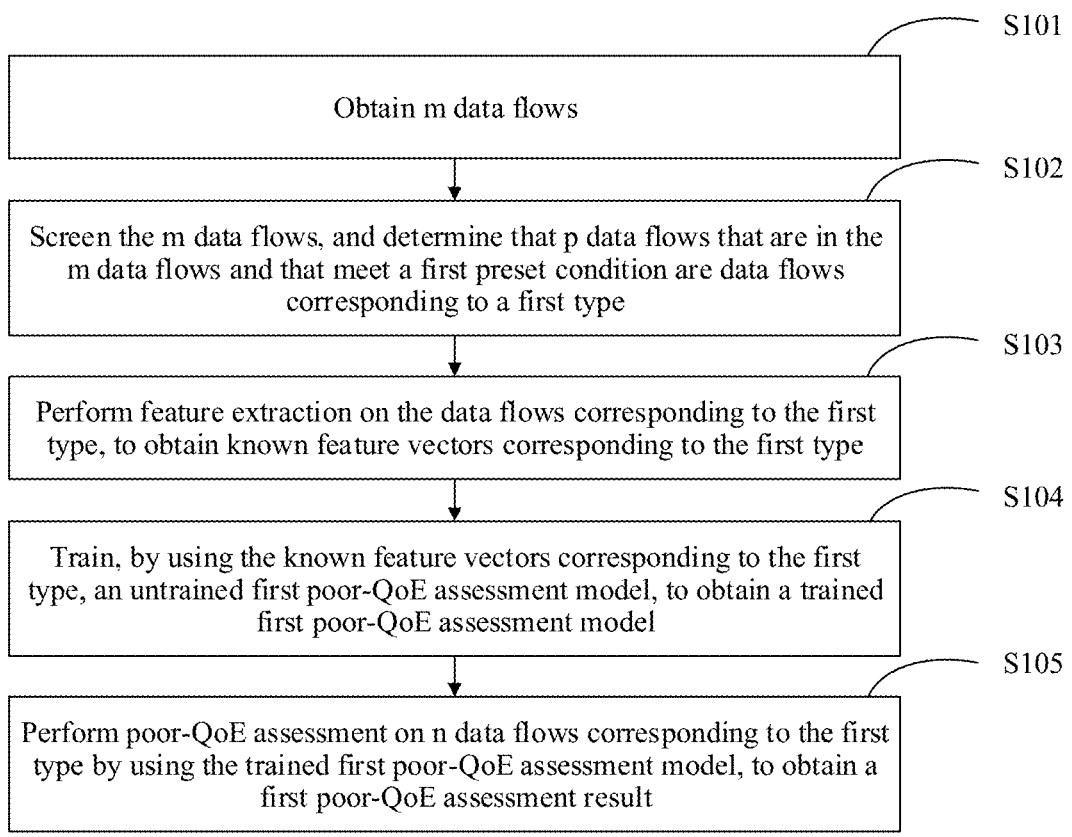
FIG. 1 is a schematic flowchart of a poor-QoE assessment method according to an embodiment of this application.

To resolve the foregoing problem, the embodiments of this application provide a poor-QoE assessment method. The method may be applied to network devices such as a router or a switch. As shown in FIG. 1, the method includes the following operations.

S101: Obtain m data streams.

The m data streams are data streams transmitted by the network device, and m is a natural number greater than 1.

In an embodiment of the application, the network device may obtain the m data streams from the data streams transmitted by the network device. The m data streams may be data streams $M_1, M_2, \ldots,$ and $M_t$ transmitted by the network device within t (t is a natural number greater than 1) time periods (the t time periods may be consecutive time periods or in-consecutive time periods). The m data streams may alternatively be data streams M transmitted by the network device within a preset time (for example, a time period between 2:00 a.m. and 3:00 a.m.). This is not specifically limited herein.

S102: Screen the m data streams, and determine that p data streams that are in the m data streams and that meet a first preset condition are data streams corresponding to a first type, where p is a natural number greater than 0.

In an embodiment of the application, a process in which the network device screens the m data streams, and determines that the p data streams that are in the m data streams and that meet the first preset condition are the data streams corresponding to the first type may include:

Operation 1: Identify the m data streams, and determine one or more application types to which the m data streams belong.

In an embodiment of the application, the network device may identify each of the m data streams, and determine a type of an application carried in each data stream, to determine the one or more application types to which the m data streams belong.

For example, it is assumed that data streams being transmitted by the network device include a data stream 1, a data stream 2, and a data stream 3. The data stream 1 is a data stream sent by an application 1 of a video play type, the data stream 2 is a data stream sent by an application 2 of a video play type, and the data stream 3 is a data stream sent by an application 3 of a game type. When transmitting the data stream 1, the data stream 2, and the data stream 3, the network device may identify, based on related information (for example, 5-tuple information) of the data stream 1, that the application 1 is an application of a video play type, identify, based on related information of the data stream 2, that the application 2 is an application of a video play type, and identify, based on related information of the data stream 3, that the application 3 is an application of a game type. After identifying the types of the application 1, the application 2, and the application 3, the network device may determine that application types to which the data stream 1, the data stream 2, and the data stream 3 belong are a video application type or a game application type.

For example, the network device may use a deep packet inspection (DPI) technology to identify 5-tuple information (including an internet protocol (IP) address, a source port number, a destination IP address, a destination port number, and a transport layer protocol), original data information (information about video, audio, or text sent by an application), or the like included in each data stream, to determine an application type carried in each data stream.

For example, it is assumed that the network device identifies, by using the DPI, that a data stream 1 includes a port number 80, and an application layer protocol corresponding to the port number 80 is a hypertext transfer protocol (HTTP). It may be determined, based on the port number 80, that an application layer protocol of an application carried in the data stream 1 is the hypertext transfer protocol. Generally, an application that uses the hypertext transfer protocol is a web page application. Therefore, it may be determined that a type of the application carried in the data stream 1 is a web page application type. For another example, it is assumed that a data stream 2 identified by the network device by using the DPI includes a port number 25, and an application layer protocol corresponding to the port number 25 is a simple mail transfer protocol (SMTP). Generally, an application that uses the simple mail transfer protocol is a mail application. Therefore, it may be determined that a type of an application carried in the data stream 2 is a mail application type.

It should be noted that, in the foregoing description, that the DPI technology is used to identify a port number included in a data stream and determine a type of an application carried in the data stream is merely used as an example. In actual application, other information (for example, a transport layer protocol or original data information) included in the data stream may further be identified, to determine the type of the application carried in the data stream. This is not specifically limited herein.

In actual application, a convolutional neural network (CNN), a support vector machine (SVM), or the like may further be used to identify a data stream and determine a type of an application carried in the data stream, to determine the one or more application types to which the m data streams belong. This is not specifically limited herein.

Operation 2: Screen out, from the m data streams, data streams corresponding to a target application type.

The target application type is any one of the one or more application types to which the m data streams belong.

That the data streams being transmitted by the network device in operation 1 include the data stream 1, the data stream 2, and the data stream 3 is still used as an example. After the network device determines that the application types to which the data stream 1, the data stream 2, and the data stream 3 belong are the video application type or the game application type, the target application type may be the video application type or the game application type. If the target application type is the video application type, the data streams corresponding to the target application type are the data stream 1 and the data stream 2. If the target application type is the game application type, the data stream corresponding to the target application type is the data stream 3.

It can be learned from S101 that the m data streams may be the data streams $M_1, M_2, \ldots,$ and $M_t$ transmitted by the network device within the t time periods, or may be the data streams M transmitted by the network device within the preset time. It may be understood that, when the m data streams are the data streams $M_1, M_2, \ldots,$ and $M_t$ transmitted by the network device within the t time periods, data streams that are corresponding to the target application type and that are screened out from the m data streams are data streams $M_1', M_2', \ldots,$ and $M_t'$ that are related to the target application type and that are transmitted by the network device within the t time periods. When the m data streams are the data streams M transmitted by the network device within the preset time, data streams that are corresponding to the target application type and that are screened out from the m data streams are data streams M' that are related to the target application type and that are transmitted by the network device within the preset time.

Operation 3: Screen out the p data streams as the data streams corresponding to the first type from the data streams corresponding to the target application type.

It may be understood that the data streams corresponding to the first type are the p data streams that are screened out from the data streams corresponding to the target application type. In this case, the data streams corresponding to the first type are also corresponding to the target application type.

It can be learned from operation 2 that the data streams corresponding to the target application type may be the data streams $M_1', M_2', \ldots,$ and $M_t'$ that are related to the target application type and that are transmitted by the network device within the t time periods, or may be the data streams M' that are related to the target application type and that are transmitted by the network device within the preset time.

When the data streams corresponding to the target application type are $M_1', M_2', \ldots,$ and $M_t'$, before the data streams corresponding to the first type are screened out from the data streams $M_1', M_2', \ldots,$ and $M_t'$ corresponding to the target application type, t bandwidth utilization rates $U_1, U_2, \ldots,$ and $U_t$ corresponding to the t time periods, t average throughputs $W_1, W_2, \ldots,$ and $W_t$ corresponding to the t time periods, and percentiles corresponding to the t average throughputs $W_1, W_2, \ldots,$ and $W_t$ need to be first obtained.

Then, based on the t bandwidth utilization rates $U_1$, $U_2$, ..., and $U_t$, the t average throughputs $W_1$, $W_2$, ..., and $W_t$, and the percentiles corresponding to the t average throughputs $W_1$, $W_2$, ..., and $W_t$, t data streams $M_{11}''$, $M_{12}''$, ... and $M_{1t}''$ corresponding to the first type are screened out from the data streams $M_1'$, $M_2'$, ..., and $M_t'$ corresponding to the target application type.

Determining of a data stream $M_{1i}''$ (i is a natural number, and 1≤i≤t) corresponding to the first type is used as an example.

When a bandwidth utilization rate $U_i$ is greater than a first preset threshold, a time period corresponding to an average throughput that is greater than a first preset percentile and that is in the t average throughputs $W_1$, $W_2$, ..., and $W_t$ is determined as a target time period, and a data stream that is in the data streams $M_1'$, $M_2'$, ..., and $M_t'$ corresponding to the target application type and that is corresponding to the target time period is determined as the data stream $M_{1i}''$ corresponding to the first type.

When the bandwidth utilization rate $U_i$ is less than or equal to the first preset threshold and greater than a second threshold, a time period corresponding to an average throughput that is greater than a second preset percentile and that is in the t average throughputs $W_1$, $W_2$, ..., and $W_t$ is determined as the target time period, and the data stream that is in the data streams $M_1'$, $M_2'$, ..., and $M_t'$ corresponding to the target application type and that is corresponding to the target time period is determined as the data stream $M_{1i}''$ corresponding to the first type.

When the bandwidth utilization rate $U_1$ is less than or equal to the second threshold, a time period corresponding to an average throughput that is greater than a third preset percentile and that is in the t average throughputs $W_1$, $W_2$, ..., and $W_t$ is determined as the target time period, and the data stream that is in the data streams $M_1'$, $M_2'$, ..., and $M_t'$ corresponding to the target application type and that is corresponding to the target time period is determined as the data stream $M_{1i}''$ corresponding to the first type.

0<the second preset threshold<the first preset threshold, and 0<the first preset percentile<the second preset percentile<the third preset percentile<100.

In actual application, the first preset threshold, the second preset threshold, the first preset percentile, the second preset percentile, and the third preset percentile may be determined based on an actual network use status. This is not specifically limited in this application. For example, the first preset threshold may be a critical value of a network congestion state and a network normal state, and the second preset threshold may be a critical value of a network normal state and a network idle state.

For clearer understanding of the embodiment of this application, the following uses an example for description.

It is assumed that the data streams corresponding to the target application type are $M_1'$, $M_2'$, ..., and $M_{10}'$, the first preset threshold is 0.7, the second preset threshold is 0.2, the first preset percentile is 70, the second preset percentile is 80, the third preset percentile is 90, the bandwidth utilization rate $U_1$ is 0.8, the bandwidth utilization rate $U_2$ is 0.6, the bandwidth utilization rate $U_3$ is 0.2, and values of 10 average throughputs $W_1$, $W_2$, ..., and $W_{10}$ are 20, 30, 23, 25, 18, 17, 16, 35, 37, and 12 respectively.

The foregoing 10 average throughputs are sorted in ascending order, and the 10 average throughputs are sorted as $W_{10}$, $W_7$, $W_6$, $W_5$, $W_1$, $W_3$, $W_4$, $W_2$, $W_8$, and $W_9$. Therefore, an average throughput in the tenth percentile is $W_{10}$, an average throughput in the twentieth percentile is $W_7$, and an average throughput in the $100^{th}$ percentile is $W_9$. The percentile is a statistical term. If a group of data is sorted in ascending order, and corresponding cumulative hundredths digits are calculated, a value of data corresponding to a hundredths digit is referred to as a percentile of the hundredths digit. For example, a value at a position of the $80^{th}$ hundredths digit is called the $80^{th}$ percentile.

When the bandwidth utilization rate $U_1$ is 0.8, and the bandwidth utilization rate $U_1$ is greater than the first preset threshold 0.7, a time period (including the second time period, the eighth time period, and the ninth time period) corresponding to an average throughput (including $W_2$, $W_8$, and $W_9$) that is greater than the $70^{th}$ percentile and that is in the 10 average throughputs is determined as the target time period, and data stream information (including $M_1'$, $M_2'$, $M_8'$, and M9') that is in the data stream information $M_1'$, $M_2'$, ..., and $M_{10}'$ in 10 time periods and that is corresponding to the target time period is determined as the data stream $M_{11}''$ corresponding to the first application type.

When the bandwidth utilization rate $U_2$ is 0.6, and the bandwidth utilization rate $U_2$ is less than the first preset threshold 0.7 and greater than the second threshold 0.2, a time period (including the eighth time period and the ninth time period) corresponding to an average throughput (including $W_8$ and $W_9$) that is greater than the $80^{th}$ percentile and that is in the 10 average throughputs is determined as the target time period, and the data stream information (including $M_8'$ and $M_9'$) that is in the data stream information $M_1'$, $M_2'$, ..., and $M_{10}'$ in the 10 time periods and that is corresponding to the target time period is determined as the data stream $M_{12}''$ corresponding to the first application type.

When the bandwidth utilization rate $U_3$ is 0.2, and the bandwidth utilization rate $U_3$ is less than the second threshold 0.2, a time period (the ninth time period) corresponding to an average throughput ($W_9$) that is greater than the $90^{th}$ percentile and that is in the 10 average throughputs is determined as the target time period, and the data stream information ($M_9'$) that is in the data stream information $M_1'$, $M_2'$, ..., and $M_{10}'$ in the 10 time periods and that is corresponding to the target time period is determined as a data stream $M_{13}''$ corresponding to the first application type.

For ease of description, the foregoing describes only a process of obtaining the data stream $M_{1i}''$ corresponding to the first type. Actually, a process of obtaining the data streams $M_{11}''$, $M_{12}''$, ..., and $M_{1t}''$ corresponding to the first type is similar to that of obtaining the data stream $M_{1i}''$ corresponding to the first type. Details are not described herein again.

When the data streams corresponding to the target application type are the data streams M' that are related to the target application type and that are transmitted by the network device within the preset time, it may be understood that performance (for example, a bandwidth utilization rate) of transmitting a data stream by the network device is usually different at different times, and characteristics of the data stream transmitted by the network device are usually different. The characteristics of the data stream include 5-tuple information, and a quantity of retransmitted packets, an upload speed and a downlink speed of each packet, a delay between packets, a jitter between packets, and the like that are in a plurality of packets included in the data stream.

For example, between 2:00 a.m. and 7:00 a.m., most users are sleeping, and the network device is usually in an idle state. A bandwidth utilization rate of the network device is relatively low, a quantity of data streams that need to be transmitted by the network device is relatively small, a delay between packets is relatively small, a jitter between packets is relatively small, a quantity of retransmitted packets is relatively small, an upload speed and a downlink speed of a packet are relatively high, and the like. It may be understood that when the network device is in the idle state, quality of a data stream transmitted by the network device is high. For another example, between 7:00 a.m. and 9:00 a.m., most users access the internet, and the network device is usually in a congested state. A bandwidth utilization rate of the network device is relatively high, a quantity of data streams that need to be transmitted by the network device is relatively large, a delay between packets is relatively large, a jitter between packets is relatively large, a quantity of retransmitted packets is relatively large, an upload speed and a downlink speed of a packet are relatively low, and the like. It may be understood that when the network device is in the congested state, quality of a data stream transmitted by the network device is low.

When the data streams corresponding to the target application type are the data streams M' that are related to the target application type and that are transmitted by the network device within the preset time, data streams $M_1''$ that are corresponding to the first type and that are screened out from the data streams M' corresponding to the target application type may be p data streams first transmitted, data streams last transmitted, or the like in the data streams M' corresponding to the target application type. This is not specifically limited herein.

For example, it is assumed that the data streams corresponding to the target application type are the data streams M' that are related to the target application type and that are transmitted by the network device between 6:00 a.m. and 8:00 a.m., including a data stream 1, a data stream 2, ..., and a data stream 100. The data stream 1, the data stream 2, ..., the data stream 3000 are transmitted by the network device between 6:00 a.m. and 7:00 a.m., and the data stream 3001, the data stream 3002, ..., and the data stream 3003 are transmitted by the network device between 7:00 a.m. and 8:00 a.m. In this case, the data streams $M_1''$ that are corresponding to the first type and that are screened out from the data streams M' corresponding to the target application type may be the first 1000 transmitted data streams, the last 1000 transmitted data streams, or the like in the data streams M' corresponding to the target application type. It may be understood that, when the data streams $M_1''$ corresponding to the first type are the first 1000 transmitted data streams in the data streams M' corresponding to the target application type, quality of the data streams $M_1''$ corresponding to the first type is high. When the data streams $M_1''$ corresponding to the first type are the last 1000 transmitted data streams in the data streams M' corresponding to the target application type, the quality of the data streams $M_1''$ corresponding to the first type is low.

In an embodiment of the application, the m data streams may further be screened, and q data streams that are in the m data streams and that meet a second preset condition are determined as data streams corresponding to a second type. All data streams in the q data streams are different from data streams in the p data streams, q is a natural number greater than 0, and p+q≤m.

In an embodiment of the application, a process of screening the m data streams, and determining that the q data streams that are in the m data streams and that meet the first preset condition are the data streams corresponding to the second type may include:

Operation 1: Identify the m data streams, and determine the one or more application types to which the m data streams belong.

Operation 2: Screen out, from the m data streams, the data streams corresponding to the target application type.

Operation 3: Screen out, from the data streams corresponding to the target application type, the q data streams as the data streams corresponding to the second type.

It may be understood that the data streams corresponding to the second type are the q data streams screened out from the data streams corresponding to the target application type. In this case, the data streams corresponding to the second type are also corresponding to the target application type.

When the data streams corresponding to the target application type are $M_1, M_2, \ldots,$ and $M_t$, t data streams $M_{21}''$, $M_{22}'', \ldots,$ and $M_{2t}''$ corresponding to the second type may be screened out, based on the t bandwidth utilization rates $U_1, U_2, \ldots,$ and $U_t$, the t average throughputs $W_1, W_2, \ldots,$ and $W_t$, and the percentiles corresponding to the t average throughputs $W_1, W_2, \ldots,$ and $W_t$, from the data streams that are $M_1', M_2', \ldots,$ and $M_t'$ and that are corresponding to the target application type.

Determining of a data stream $M_{2i}''$ corresponding to the second type is used as an example.

When the bandwidth utilization rate $U_i$ is greater than the first preset threshold, a time period corresponding to an average throughput that is less than a fourth preset percentile and that is in the t average throughputs $W_1, W_2, \ldots,$ and $W_t$ is determined as a first target time period, and a data stream that is in the data streams $M_1', M_2', \ldots,$ and $M_t'$ corresponding to the target application type and that is corresponding to the first target time period is determined as the data stream $M_{2i}''$ corresponding to the second type.

When the bandwidth utilization rate $U_i$ is less than or equal to the first preset threshold and greater than the second threshold, a time period corresponding to an average throughput that is less than a fifth preset percentile and that is in the t average throughputs $W_1, W_2, \ldots,$ and $W_t$ is determined as the first target time period, and the data stream that is in the data streams $M_1', M_2', \ldots,$ and $M_t'$ corresponding to the target application type and that is corresponding to the first target time period is determined as the data stream $M_{2i}''$ corresponding to the second type.

When the bandwidth utilization rate $U_i$ is less than or equal to the second threshold, a time period corresponding to an average throughput that is less than a sixth preset percentile and that is in the t average throughputs $W_1, W_2, \ldots,$ and $W_t$ is determined as the first target time period, and the data stream that is in the data streams $M_1', M_2', \ldots,$ and $M_t'$ corresponding to the target application type and that is corresponding to the first target time period is determined as the data stream $M_{2i}''$ corresponding to the second type.

0<the second preset threshold<the first preset threshold, and 0<the sixth preset percentile<the fifth preset percentile<the fourth preset percentile<the first preset percentile.

In actual application, the fourth preset percentile, the fifth preset percentile, and the sixth preset percentile may be determined based on an actual network use status. This is not specifically limited in this application.

For ease of description, the foregoing describes only a process of obtaining the data stream $M_{2i}''$ corresponding to the second type. Actually, a process of obtaining the data streams $M_{21}'', M_{22}'', \ldots,$ and $M_{2t}''$ corresponding to the second type is similar to that of obtaining the data stream $M_{2i}''$ corresponding to the second type. Details are not described herein again.

It can be learned that the data stream $M_{1i}''$ corresponding to the first type is a data stream that is related to the target application type and that is transmitted by the network device within a time period corresponding to an average throughput that is relatively large in the t average throughputs $W_1, W_2, \ldots,$ and $W_t$. The data stream transmitted by the network device within the time period in which the average throughput is relatively large usually has the following characteristics: a delay between packets is relatively small, a jitter between packets is relatively small, a quantity of retransmitted packets is relatively small, an uplink speed and a downlink speed of a packet are relatively high, and the like. It may be understood that quality of the data stream $M_{1i}"$ corresponding to the first type is relatively high.

The data stream $M_{2i}"$ corresponding to the second type is a data stream that is related to the target application type and that is transmitted by the network device within a time period corresponding to an average throughput that is relatively small in the t average throughputs $W_1, W_2, \ldots,$ and $W_t$. The data stream transmitted by the network device within the time period in which the average throughput is relatively small usually has the following characteristics: a delay between packets is relatively large, a jitter between packets is relatively large, a quantity of retransmitted packets is relatively large, an uplink speed and a downlink speed of a packet are relatively low, and the like. It may be understood that quality of the data stream $M_{2i}"$ corresponding to the second type is relatively poor.

When the data streams corresponding to the target application type are data streams M', after the data streams $M_1"$ corresponding to the first type are screened out from the data streams M' corresponding to the target application type, some or all of remaining data streams in the data streams M' corresponding to the target application type may be used as data streams $M_2"$ corresponding to the second type.

For example, it is assumed that the data streams M' corresponding to the target application type obtained by the network device are data streams between 6:00 a.m. and 8:00 a.m., including a data stream 1, a data stream 2, . . . , and a data stream 10000. If it is determined that 1000 data streams, namely, the data stream 1 to the data stream 1000, are first transmitted by the network device are the data streams $M_1"$ corresponding to the first type, 1000 data streams between the data stream 1001 and the data stream 2001 that are subsequently transmitted by the network device or 1000 data streams between the data stream 9000 and the data stream 10000 may be determined as the data streams $M_2"$ corresponding to the second type.

S103: Perform feature extraction on the data streams corresponding to the first type, to obtain known feature vectors corresponding to the first type.

It can be learned from the foregoing embodiment that the first type is corresponding to the p data streams.

In an embodiment of the application, feature data included in a known feature vector V corresponding to the first type includes but is not limited to the following data: a total packet quantity, a total packet length, a maximum packet length, a minimum packet length, an average packet length, a maximum packet spacing, a minimum packet spacing, an average packet spacing, a packet spacing standard deviation, a packet spacing percentile, a maximum delay, a minimum delay, an average delay, a delay percentile, a delay standard deviation, and the other feature data that are of the p data streams.

For example, the network device may calculate the total packet quantity, the total packet length, the maximum packet length, the minimum packet length, the average packet length, the maximum packet spacing, the minimum packet spacing, the packet average spacing, the packet spacing standard deviation, the packet spacing percentile, the maximum delay, the minimum delay, the average delay, the delay percentile, the delay standard deviation, and the other feature data that are of each data stream based on information such as sequence numbers, acknowledgment numbers, sending timestamps, receiving timestamps, and sizes that are of the plurality of packets included in each of the p data streams corresponding to the first type.

For example, a delay of each packet may be calculated by using a receiving timestamp and a sending timestamp that are of each of a plurality of packets included in a data stream. After delays of the plurality of packets included in the data stream are calculated, a maximum delay, a minimum delay, average delay, a delay percentile, and a delay standard deviation may be obtained based on the delays of the plurality of packets. An average delay can be obtained by dividing a sum of the delays of the plurality of packets by a quantity of the plurality of packets. For another example, a total quantity of packets may be calculated by using the sequence numbers of the plurality of packets.

After feature data of each of the p data streams is calculated, the total packet quantity, the total packet length, the maximum packet length, the minimum packet length, the average packet length, the maximum packet spacing, the minimum packet spacing, the average packet spacing, the packet spacing standard deviation, the packet spacing percentile, the maximum delay, the minimum delay, the average delay, the delay percentile, the delay standard deviation, and the other feature data that are of the p data streams may be calculated.

It should be understood that the feature data included in the known feature vector V corresponding to the first type is not limited to the total packet quantity, the total packet length, and the other feature data that are of the p data streams listed above. The known feature vector V corresponding to the first type may further include other or more feature data. This is not specifically limited herein.

In actual application, after one or more feature data are obtained, a standardized operation (for example, non-dimensionalization) may further be performed on the one or more feature data. This is not specifically limited herein.

In an embodiment of the application, the feature extraction may further be performed on the q data streams corresponding to the second type, to obtain the known feature vectors corresponding to the second type. A process of performing the feature extraction on the q data streams corresponding to the second type to obtain the feature vectors corresponding to the second type is similar to that of performing the feature extraction on the p data streams corresponding to the first type to obtain the feature vector V corresponding to the first type. Details are not described herein again.

S104: Train, by using the known feature vectors corresponding to the first type, an untrained first poor-QoE assessment model, to obtain a trained first poor-QoE assessment model.

It should be noted that, to improve accuracy of the trained first poor-QoE assessment model, a large quantity of known feature vectors $V_1, V_2, \ldots,$ and $V_t$ corresponding to the first type usually need to be obtained to train the untrained first poor-QoE assessment model.

In an embodiment, the first poor-QoE assessment model includes but is not limited to learning models such as a k-means clustering model, a principal component analysis model, a multivariate Gaussian distribution model, a first-type support vector machine model, a robust covariance estimation model, and an isolated forest model.

It may be understood that when first poor-QoE assessment models are different learning models, different untrained first poor-QoE assessment models are trained by using a large quantity of known feature vectors corresponding to the first type. A training process may be different from that of obtaining the trained first poor-QoE assessment model.

Herein, the training process is described by using an example in which the untrained first poor-QoE assessment model is an untrained k-means clustering model.

Figure 2:
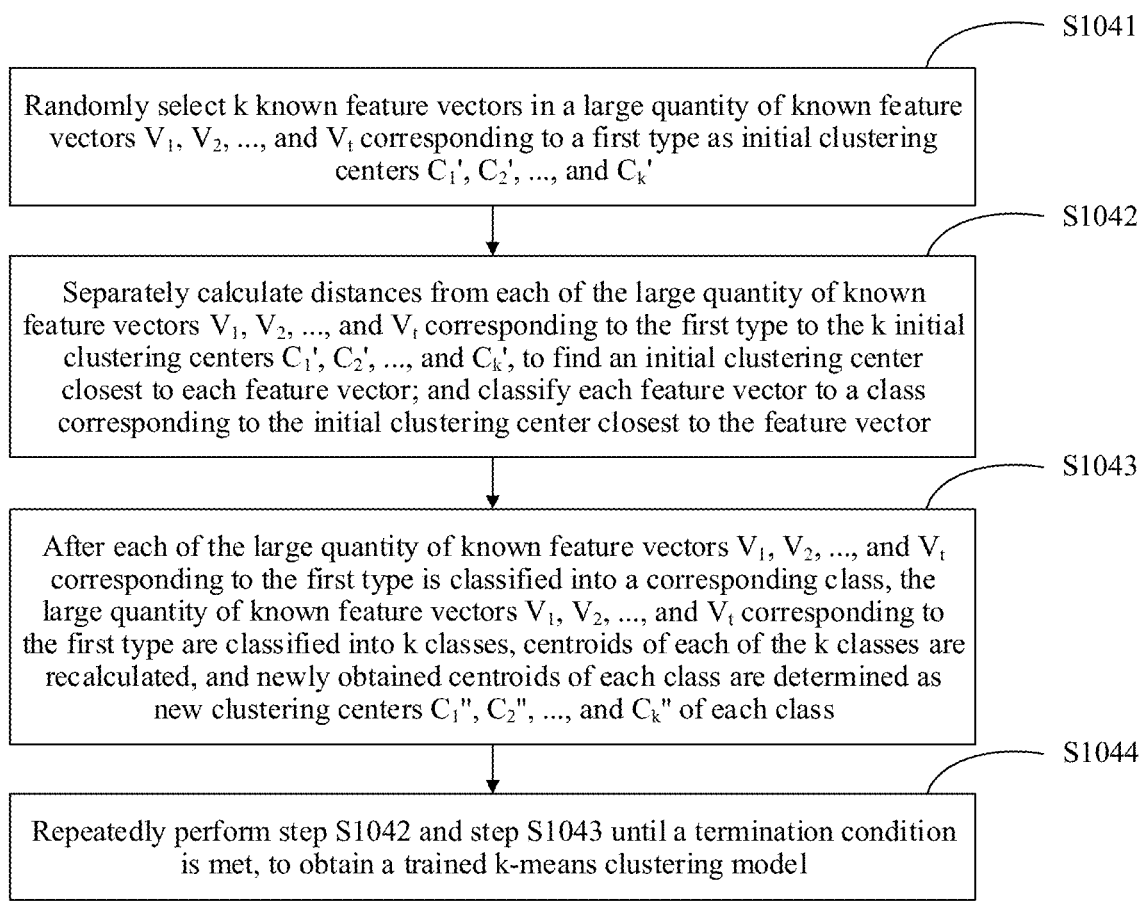
FIG. 2 is a schematic flowchart of training an untrained k-means clustering model by using a large quantity of known feature vectors to obtain a trained k-means clustering model according to an embodiment of this application.

As shown in FIG. 2, the process may include the following operations.

S1041: Randomly select k known feature vectors in a large quantity of known feature vectors $V_1, V_2, \ldots,$ and $V_t$ corresponding to the first type as initial clustering centers $C_1', C_2', \ldots,$ and $C_k'$.

A size of k is usually the same as a quantity of classes into which data is to be classified. This is not specifically limited herein. k is a natural number, and k≥1. For example, if the large quantity of known feature vectors $V_1, V_2, \ldots,$ and $V_t$ corresponding to the first type need to be classified into three types, k is 3.

S1042: Separately calculate distances from each of the large quantity of known feature vectors $V_1, V_2, \ldots,$ and $V_t$ corresponding to the first type to the k initial clustering centers $C_1', C_2', \ldots,$ and $C_k'$, to find an initial clustering center closest to each feature vector; and classify each feature vector to a class corresponding to the initial clustering center closest to the feature vector.

In actual application, the distances from each feature vector to the k initial clustering centers may be a Euclidean distance, a Manhattan distance, or the like. This is not specifically limited herein.

The following is an example of calculating a distance from a known feature vector $V_i$ to a clustering center $C_h'$.

A formula for calculating a Euclidean distance $d(V_i, C_h')$ from the to-be-assessed feature vector $V_i$ to the clustering center $C_h'$ is as follows:

$$d(V_i, C_h') = \sqrt{\sum_{j=1}^{n} (V_{ij} - C_{hj}')^2}$$

A formula for calculating a Manhattan distance $d(V_i, C_h')'$ from a to-be-assessed feature vector $V_i$ to the clustering center $C_h'$ is as follows:

$$d(V_i, C_h')' = \sqrt{\sum_{j=1}^{n} (V_{ij} - C_{hj}')^2}$$

n represents a quantity of dimensions of the known feature vector $V_i$, h is a natural number, and 1≤h≤k.

S1043: After each of the large quantity of known feature vectors $V_1, V_2, \ldots,$ and $V_t$ corresponding to the first type is classified into a corresponding class, the large quantity of known feature vectors $V_1, V_2, \ldots,$ and $V_t$ corresponding to the first type are classified into k classes, centroids of each of the k classes are recalculated, and newly obtained centroids of each class are determined as new clustering centers $C_1'', C_2'', \ldots,$ and $C_k''$ of each class.

S1044: Repeatedly perform operations S1042 and S1043 until a termination condition is met, to obtain a trained k-means clustering model.

The termination condition may be a maximum quantity of iterations, a minimized square error, a change rate of a cluster central point, or the like. This is not specifically limited herein.

When the termination condition is met, the large quantity of known feature vectors $V_1, V_2, \ldots,$ and $V_t$ corresponding to the first type are further divided into k classes that do not change, and each of the k classes is corresponding to one target cluster center (a cluster center that does not change). Herein, $C_1$ and $C_2, \ldots,$ and $C_k$ correspondingly represent k target clustering centers.

Figure 3:
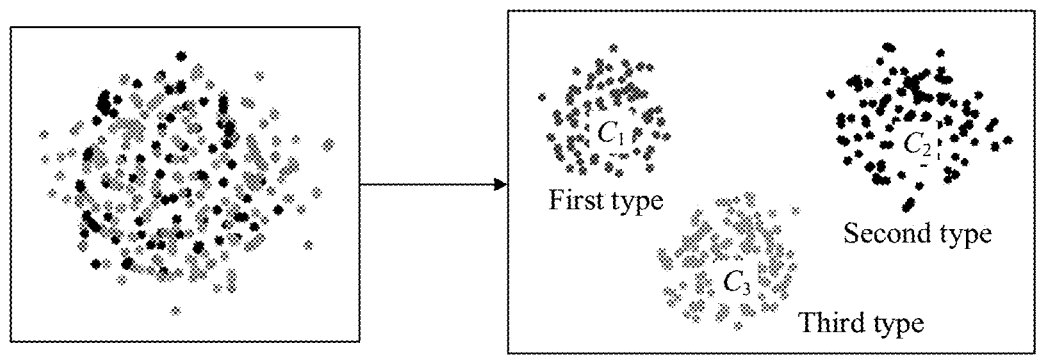
FIG. 3 is a schematic diagram of training an untrained k-means clustering model by using a large quantity of known feature vectors to obtain k classes and k target clustering centers according to an embodiment of this application.

For example, k is 3. As shown in FIG. 3, the large quantity of known feature vectors $V_1, V_2, \ldots,$ and $V_t$ corresponding to the first type are finally divided into three classes. A target clustering center of the first class is $C_1$, a target clustering center of the second class is $C_2$, and a target clustering center of the third class is $C_3$.

In an embodiment of the application, the network device includes at least one untrained poor-QoE assessment model, each of the at least one untrained poor-QoE assessment model is corresponding to one or more application types, the untrained first poor-QoE assessment model is any one of the at least one untrained poor-QoE assessment model, and the untrained first poor-QoE assessment model is corresponding to the target application type.

For example, the network device includes an untrained poor-QoE assessment model A, an untrained poor-QoE assessment model B, and an untrained poor-QoE assessment model C. The untrained poor-QoE assessment model A is corresponding to an application type 1 and an application type 2. The untrained poor-QoE assessment model B is corresponding to an application type 3 and an application type 4. The untrained poor-QoE assessment model C is corresponding to an application type 5. If the target application type is the application type 2, when the large quantity of known feature vectors corresponding to the first type are trained, the untrained poor-QoE assessment model A corresponding to the application type 2 may be selected as the untrained first poor-QoE assessment model. If the target application type is the application type 4, when the large quantity of known feature vectors corresponding to the first type are trained, the untrained poor-QoE assessment model B may be selected as the untrained first poor-QoE assessment model.

In actual application, the at least one untrained poor-QoE assessment model included in the network device includes but is not limited to an untrained k-means clustering model, an untrained principal component analysis model, an untrained multivariate Gaussian distribution model, an untrained first-type support vector machine model, an untrained robust covariance estimation model, an untrained isolated forest model, and the like. This is not specifically limited herein.

In an embodiment of the application, an untrained second poor-QoE assessment model may further be trained by using known feature vectors corresponding to a second type, to obtain a trained second poor-QoE assessment model. A process of training the untrained second poor-QoE assessment model by using the known feature vectors corresponding to the second type to obtain the trained second poor-QoE assessment model is the same as that of training the untrained first poor-QoE assessment model by using the known feature vectors corresponding to the first type to obtain the trained first poor-QoE assessment model. Details are not described herein again.

In actual application, after the trained first poor-QoE assessment model and the trained second poor-QoE assessment model are obtained, the trained first poor-QoE assessment model and the trained second poor-QoE assessment model may be deployed online for application. After the trained first poor-QoE assessment model and the trained second poor-QoE assessment model are deployed online for application, precision of the trained first poor-QoE assessment model and the trained second poor-QoE assessment model may be periodically verified at a preset time interval (for example, half a month or one month). If the precision of the trained first poor-QoE assessment model and the trained second poor-QoE assessment model decreases greatly, and the models are severely degraded, data may be re-collected to train the trained first poor-QoE assessment model and the trained second poor-QoE assessment model, and model parameters are further optimized, to improve accuracy of the models and ensure accuracy of poor-QoE assessment.

S105: Perform poor-QoE assessment on the n data streams by using the trained first poor-QoE assessment model, to obtain a first poor-QoE assessment result.

The n data streams are data streams after the m data streams transmitted by the network device, all the n data streams are corresponding to the first type, and n is a natural number greater than 0.

In an embodiment of the application, a process of performing the poor-QoE assessment on the n data streams by using the trained first poor-QoE assessment model, to obtain the first poor-QoE assessment result may include:

S1051: Perform feature extraction on the n data streams, to obtain to-be-assessed feature vectors corresponding to the first type.

In an embodiment of the application, feature data included in a to-be-assessed feature vector x corresponding to the first type includes but is not limited to the following data: a total packet quantity, a total packet length, a maximum packet length, a minimum packet length, an average packet length, a maximum packet spacing, a minimum packet spacing, an average packet spacing, a packet spacing standard deviation, a packet spacing percentile, a maximum delay, a minimum delay, an average delay, a delay percentile, a delay standard deviation, and other feature data that are of the n data streams.

It should be understood that the feature data included in the to-be-assessed feature vector x corresponding to the first type is not limited to the total packet quantity, the total packet length, and the other feature data that are of the n data streams listed above. The to-be-assessed feature vector x corresponding to the first type may further include other or more feature data. This is not specifically limited herein.

S1052: Input the to-be-assessed feature vectors corresponding to the first type into the trained first poor-QoE assessment model for the poor-QoE assessment, to obtain the first poor-QoE assessment result.

In an embodiment of the application, the trained first poor-QoE assessment model reflects a mapping relationship between the to-be-assessed feature vectors corresponding to the first type and the first poor-QoE assessment result. The trained first poor-QoE assessment model may be expressed as:

$$y=\text{estimate}(x)$$

y is the first poor-QoE assessment result, x is the to-be-assessed feature vector corresponding to the first type, and estimate( ) is the mapping relationship between the first poor-QoE assessment result and the to-be-assessed feature vector x corresponding to the first type. estimate( ) may be obtained by training the untrained first poor-QoE assessment model by using the large quantity of known feature vectors corresponding to the first type.

It can be learned from the foregoing embodiment that the untrained first poor-QoE assessment model includes but is not limited to learning models such as the untrained k-means clustering model, the untrained principal component analysis model, the untrained multivariate Gaussian distribution model, the untrained first-type support vector machine model, the untrained robust covariance estimation model, and the untrained isolated forest model.

It may be understood that when the first poor-QoE assessment models are different learning models, different untrained first poor-QoE assessment models are trained by using the known feature vectors corresponding to the first type. The obtained trained first poor-QoE assessment models are also different. If the to-be-assessed feature vectors corresponding to the first type are input into the different trained first poor-QoE assessment models for the poor-QoE assessment, a process of the poor-QoE assessment may be different from that of obtaining the poor-QoE assessment result.

Herein, the poor-QoE assessment process and the first poor-QoE assessment result are described by using an example in which the trained first poor-QoE assessment model is the trained k-means clustering model.

The to-be-assessed feature vector x is input into the trained k-means clustering model. The k-means clustering model calculates distances $d(x, C_1)$, $d(x, C_2)$, . . . , and $d(x, C_k)$ that are from the to-be-assessed feature vector x to the k target clustering centers $C_1, C_2, \ldots,$ and $C_k$, to find a target cluster center closest to the to-be-assessed feature vector x; and then classifies the to-be-assessed feature vector x into a class corresponding to the target cluster center closest to the to-be-assessed feature vector x. Herein, the k target clustering centers $C_1, C_2, \ldots,$ and $C_k$ are obtained in a process of training the untrained k-means clustering model by using the known feature vectors corresponding to the first type. For details, refer to FIG. 2 and related descriptions.

The distances, $d(x, C_1)$, $d(x, C_2)$, . . . , and $d(x, C_k)$ that are from the to-be-assessed feature vector x to the k target clustering centers $C_1, C_2, \ldots,$ and $C_k$, calculated by the trained k-means clustering model may be a Euclidean distance, a Manhattan distance, or the like. This is not specifically limited herein.

Figure 4:
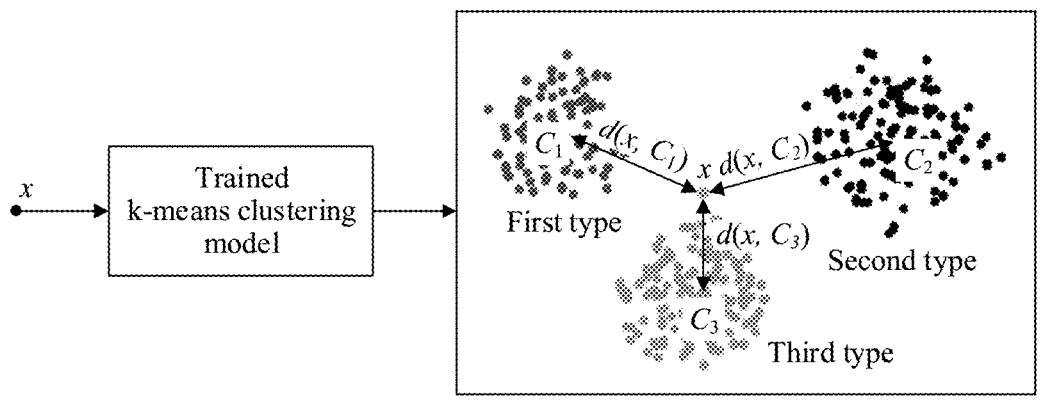
FIG. 4 is a schematic diagram of a first poor-QoE assessment result obtained by performing poor-QoE assessment on a to-be-assessed feature vector x according to an embodiment of this application.

For example, k is 3. As shown in FIG. 4, the to-be-assessed feature vector x is input into the trained k-means clustering model for the poor-QoE assessment, and the obtained poor-QoE assessment result includes Euclidean distances $d(x, C_1)$, $d(x, C_2)$, . . . , and $d(x, C_k)$ from the to-be-assessed feature vector x to three target clustering centers $C_1, C_2, \ldots,$ and $C_3$. A distance from the to-be-assessed feature vector x to the target clustering center $C_3$ is the shortest. The trained k-means clustering model classifies the to-be-assessed feature vector x into the third class.

In an embodiment of the application, poor-QoE assessment may further be performed, by using the trained second poor-QoE assessment model, on w data streams corresponding to the second type, to obtain a second poor-QoE assessment result. The w data streams are data streams after the m data streams transmitted by the network device, and w is a natural number greater than 0.

A process of performing the poor-QoE assessment on the w data streams by using the trained second poor-QoE assessment model to obtain the second poor-QoE assessment result is similar to that of performing the poor-QoE assessment on the n data streams by using the trained first poor-QoE assessment model to obtain the first poor-QoE assessment result. Details are not described herein again.

After obtaining the first poor-QoE assessment result and the second poor-QoE assessment result, the network device may send the first poor-QoE assessment result and the second poor-QoE assessment result to a scheduler. The scheduler may pertinently schedule a service resource for an application of the target application type based on the first poor-QoE assessment result and the second poor-QoE assessment result, for example, allocating more or less bandwidth to the application of the target application type. A user may further perform in-depth analysis on the poor-QoE assessment result, to determine a problem existing in the application of the target application type, for example, a reason for poor quality of experience, of the user, caused by the application of the target application type, a severity of a fault that causes the poor quality of experience of the user, or a position of the fault that causes the poor quality of experience of the user.

It can be learned from the foregoing embodiment that, in the poor-QoE assessment method provided in an embodiment of the application, the trained first poor-QoE assessment model can be used to perform the poor-QoE assessment on the n data streams that are corresponding to the first type (namely, the target application type) and that are transmitted by the network device, to obtain the first poor-QoE assessment result. The method is not limited to performing poor-QoE assessment on an application, resolves a problem that in an existing poor-QoE assessment method, poor-QoE assessment can be only performed on a same type of applications instead of an application, and is universally used. In addition, it may further be learned that the trained first poor-QoE assessment model is obtained by training the untrained first poor-QoE assessment model by using a data stream corresponding to the first type and that is screened out from the m data streams. The trained first poor-QoE assessment model obtained by training the untrained first poor-QoE assessment model by using the screened data stream can be used to better perform the poor-QoE assessment on the n data streams that are corresponding to the first type and that are transmitted by the network device, and the obtained first poor-QoE assessment result can better help a network operator schedule the service resource.

The foregoing describes in detail the poor-QoE assessment method in the embodiments of this application. Based on a same inventive concept, the following continues to provide a poor-QoE assessment apparatus in the embodiments of this application. The poor-QoE assessment apparatus provided in this application may be used in network devices such as a router or a switch. This is not specifically limited herein.

Figure 5:
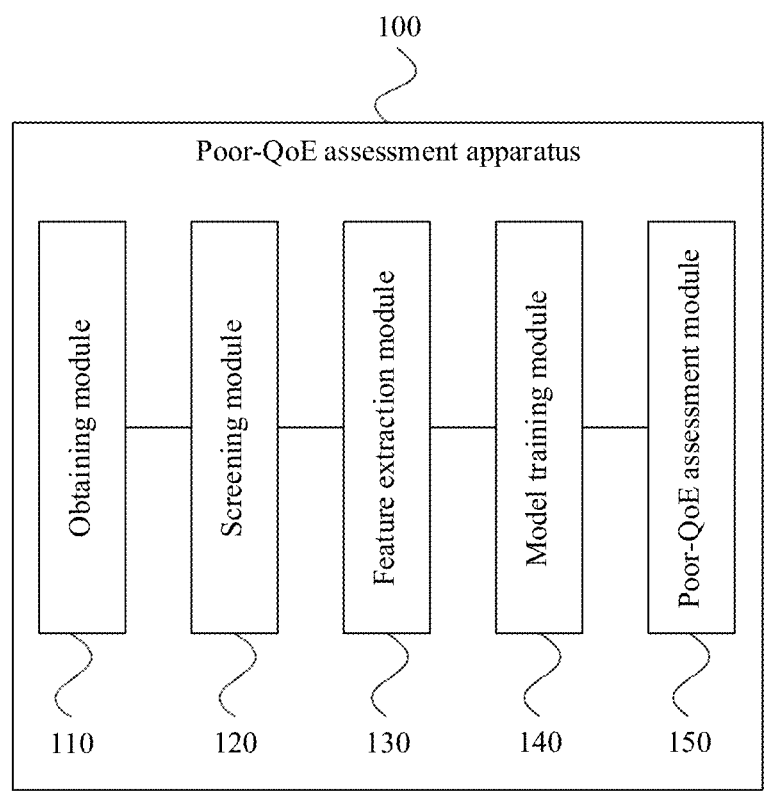
FIG. 5 is a schematic structural diagram of a poor-QoE assessment apparatus according to an embodiment of this application.

FIG. 5 is a schematic structural diagram of a poor-QoE assessment apparatus 100 according to an embodiment of this application. The poor-QoE assessment apparatus 100 includes at least an obtaining module 110, a screening module 120, a feature extraction module 130, a model training module 140, and a poor-QoE assessment module 150.

The obtaining module 110 is configured to obtain m data streams, where the m data streams are data streams transmitted by a network device, and m is a natural number greater than 1.

The screening module 120 is configured to screen the m data streams, and determine that p data streams that are in the m data streams and that meet a first preset condition are data streams corresponding to a first type, where p is a natural number greater than 0.

The feature extraction module 130 is configured to perform feature extraction on the data streams corresponding to the first type, to obtain known feature vectors corresponding to the first type.

The model training module 140 is configured to train, by using the known feature vectors corresponding to the first type, an untrained first poor-QoE assessment model, to obtain a trained first poor-QoE assessment model.

The poor-QoE assessment module 150 is configured to perform, by using the trained first poor-QoE assessment model, poor-QoE assessment on n data streams corresponding to the first type, to obtain a first poor-QoE assessment result, where the n data streams are data streams after the m data streams transmitted by the network device, and n is a natural number greater than 0.

In an embodiment of the application, the poor-QoE assessment module 150 is configured to:

perform feature extraction on the n data streams, to obtain to-be-assessed feature vectors corresponding to the first type, and input the to-be-assessed feature vectors corresponding to the first type into the trained first poor-QoE assessment model to perform the poor-QoE assessment, to obtain the first poor-QoE assessment result.

In an embodiment of the application, the m data streams are data streams $M_1, M_2, \ldots,$ and $M_t$ that are transmitted by the network device within t time periods, and t is a natural number greater than 1. Before screening the m data streams and determining that the p data streams that are in the m data streams and that meet the first preset condition are the data streams corresponding to the first type, the obtaining module 110 is further configured to obtain t bandwidth utilization rates $U_1, U_2, \ldots,$ and $U_t$ corresponding to the t time periods, t average throughputs $W_1, W_2, \ldots,$ and $W_t$ corresponding to the t time periods, and percentiles corresponding to the t average throughputs $W_1, W_2, \ldots,$ and $W_t$.

The screening module 120 is configured to:

identify the m data streams, and determine one or more application types to which the m data streams belong, and correspondingly screen out, from the m data streams, data streams $M_1', M_2', \ldots,$ and $M_t'$ corresponding to a target application type, where the target application type is any one of the one or more application types to which the m data streams belong;

when a bandwidth utilization rate $U_i$ is greater than a first preset threshold, determine a time period corresponding to an average throughput that is greater than a first preset percentile and that is in the t average throughputs $W_1, W_2, \ldots,$ and $W_t$ as a target time period, and determine a data stream that is in the data streams $M_1', M_2', \ldots,$ and $M_t'$ corresponding to the target application type and that is corresponding to the target time period as a data stream $M_i''$ corresponding to the first type, where i is a natural number, and $1 \le i \le t$;

when the bandwidth utilization rate $U_i$ is less than or equal to the first preset threshold and greater than a second preset threshold, determine a time period corresponding to an average throughput that is greater than a second preset percentile and that is in the t average throughputs $W_1, W_2, \ldots,$ and $W_t$ as the target time period, and determine the data stream that is in the data streams $M_1', M_2', \ldots,$ and $M_t'$ corresponding to the target application type and that is corresponding to the target time period as the data stream $M_i''$ corresponding to the first type; and when the bandwidth utilization rate $U_i$ is less than or equal to the second preset threshold, determine a time period corresponding to an average throughput that is greater than a third preset percentile and that is in the t average throughputs $W_1, W_2, \ldots$, and $W_t$ as the target time period, and determine the data stream that is in the data streams $M_1'$, $M_2', \ldots$, and $M_t'$ corresponding to the target application type and that is corresponding to the target time period as the data stream $M_i''$ corresponding to the first type, where 0<the second preset threshold<the first preset threshold, and 0<the first preset percentile<the second preset percentile<the third preset percentile<100.

In an embodiment of the application, the screening module 120 is further configured to determine that q data streams that are in the m data streams and that meet a second preset condition are data streams corresponding to a second type, where all data streams in the q data streams are different from data streams in the p data streams, q is a natural number greater than 0, and p+q≤m.

The feature extraction module 130 is further configured to perform feature extraction on the data streams corresponding to the second type, to obtain known feature vectors corresponding to the second type.

The model training module 140 is further configured to train, by using the known feature vectors corresponding to the second type, an untrained second poor-QoE assessment model, to obtain a trained second poor-QoE assessment model.

The poor-QoE assessment module 150 is further configured to perform, by using the trained second poor-QoE assessment model, poor-QoE assessment on w data streams corresponding to the second type, to obtain a second poor-QoE assessment result, where the w data streams are data streams after the m data streams transmitted by the network device, and w is a natural number greater than 0.

In an embodiment of the application, the network device includes at least one untrained poor-QoE assessment model, each of the at least one untrained poor-QoE assessment model is corresponding to one application type, the untrained first poor-QoE assessment model is any one of the at least one untrained poor-QoE assessment model, and the untrained first poor-QoE assessment model is corresponding to the target application type.

For example, for an embodiment of performing various operations by the poor-QoE assessment apparatus 100, refer to descriptions in related content in the foregoing method embodiments. For brevity of the specification, details are not described herein again.

It should be understood that the poor-QoE assessment apparatus 100 is merely an example provided in an embodiment of the application. In addition, the poor-QoE assessment apparatus 100 may have more or fewer components than those shown in FIG. 5, may combine two or more components, or may have different component configurations.

Figure 6:
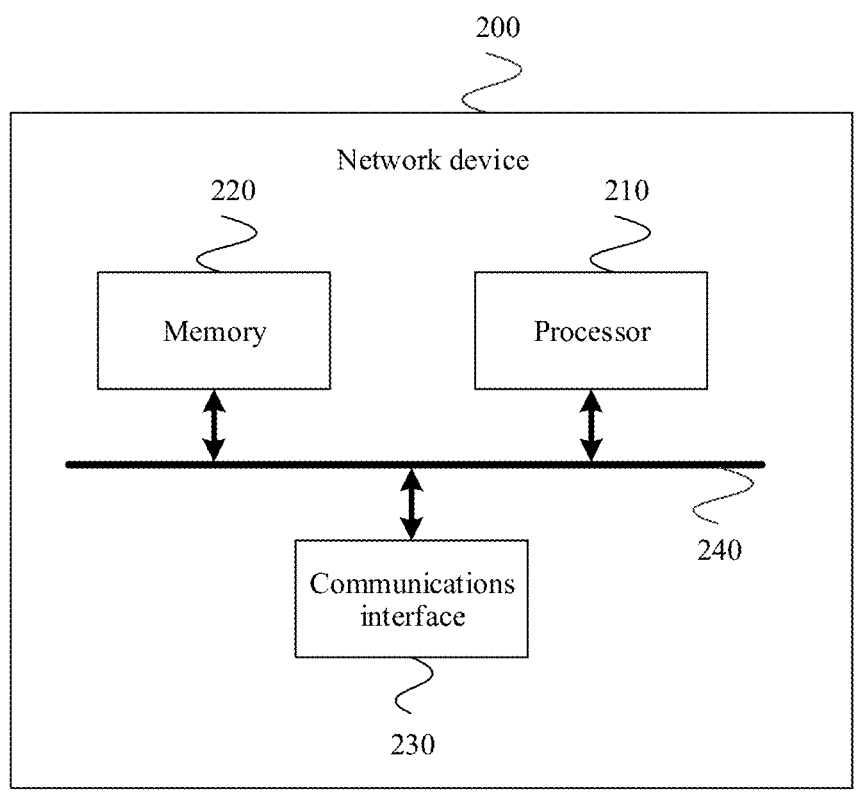
FIG. 6 is a schematic structural diagram of a network device according to an embodiment of this application.

The embodiments of this application further provide a network device. FIG. 6 is a schematic structural diagram of a network device 200 according to an embodiment of this application. The network device 200 includes a processor 210, a communications interface 230, and a memory 220. The processor 210, the communications interface 230, and the memory 220 are coupled through a bus 240.

The processor 210 may include one or more general-purpose processors. The general-purpose processor may be any type of device that can process electronic instructions, and includes a CPU, a microprocessor, a microcontroller, a main processor, a controller, an application-specific integrated circuit (ASIC), and the like. The processor 210 reads program code stored in the memory 220, and cooperates with the communications interface 230 to perform some or all operations of the method performed by the poor-QoE assessment apparatus 100 in the foregoing embodiment of this application.

The communications interface 230 may be a wired interface (for example, an Ethernet interface) or a wireless interface (for example, a cellular network interface or a wireless local area network interface), and is configured to communicate with another computing node or apparatus. When the communications interface 230 is a wired interface, the communications interface 230 may use a transmission control protocol/internet protocol (TCP/IP) suite, for example, a remote function call (RFC) protocol, a simple object access protocol (SOAP) protocol, a simple network management protocol (SNMP) protocol, a common object request broker architecture (CORBA) protocol, and a distributed protocol.

The memory 220 may store program code and program data. The program code includes code of the obtaining module 110, code of the screening module 120, code of the feature extraction module 130, and the like. The program data includes m packets, packets corresponding to the first type, known feature vectors corresponding to the first type, to-be-assessed feature vectors corresponding to the first type, and the like. In actual application, the memory 220 may include a volatile memory, for example, a random access memory (RAM). The memory may also include a non-volatile memory, for example, a read-only memory (ROM), a flash memory, a hard disk drive (HDD), or a solid-state drive (SSD). The memory may further include a combination of the foregoing types of memories.

The bus 240 may be a peripheral component interconnect (PCI) bus, an extended industry standard architecture (EISA for short) bus, or the like. The bus 240 may be classified into an address bus, a data bus, a control bus, and the like. For ease of representation, only one thick line is used to represent the bus in FIG. 6, but this does not mean that there is only one bus or only one type of bus.

It should be understood that the network device 200 is merely an example provided in the embodiments of this application. In addition, the network device 200 may have more or fewer components than those shown in FIG. 6, may combine two or more components, or may have different component configurations.

The embodiments of this application further provide a computer storage medium. The computer storage medium stores instructions. When the instructions are run on a processor, the method operations in the foregoing method embodiments may be implemented. For an embodiment of performing the method operations by the processor of the computer storage medium, refer to operations in the foregoing method embodiments. Details are not described herein again.

The embodiments of this application further provide a computer program product. When the computer program product is read and executed by a computer, some or all of the operations of the poor-QoE assessment method recorded in the foregoing method embodiments are implemented.

All or some of the foregoing embodiments may be implemented by using software, hardware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), or a semiconductor medium (for example, an SSD).

A sequence of the operations in the methods in the embodiments of this application may be adjusted, combined, or deleted based on actual requirements. Modules in the apparatus in the embodiments of this application may be divided, combined, or deleted based on actual requirements.

The embodiments of this application are described in detail above. The principles and implementations of this application are described herein by using examples. The description about the embodiments of this application is merely provided to help understand the method and core ideas of this application. In addition, one of ordinary skilled in the art can make variations and modifications to this application in terms of the embodiments and application scopes based on the ideas of this application. Therefore, the content of specification shall not be construed as a limit to this application.

What is claimed is:

1. A quality of experience (QoE) assessment method applied to a network device comprising:
    obtaining m data streams transmitted by the network device, and m is a natural number greater than 1, wherein the m data streams are data streams $M_1$, $M_2$, ..., and $M_t$ transmitted by the network device within t time periods, wherein t is a natural number greater than 1;
    obtaining t bandwidth utilization rates $U_1$, $U_2$, ..., and $U_t$ corresponding to the t time periods, t average throughputs $W_1$, $W_2$, ..., and $W_t$ corresponding to the t time periods, and percentiles corresponding to the t average throughputs $W_1$, $W_2$, ..., and $W_t$;
    screening the m data streams, and determining that p data streams that are in the m data streams and that meet a first preset condition are data streams corresponding to a first type, wherein p is a natural number greater than 0;
    performing feature extraction on the data streams corresponding to the first type to obtain known feature vectors corresponding to the first type;
    training, by using the known feature vectors corresponding to the first type, an untrained first QoE assessment model to obtain a trained first QoE assessment model; and
    performing, by using the trained first QoE assessment model, QoE assessment on n data streams corresponding to the first type to obtain a first QoE assessment result, wherein the n data streams are data streams after the m data streams transmitted by the network device, and n is a natural number greater than 0.

2. The method according to claim 1, wherein the performing poor QoE assessment on n data streams comprises:
    performing feature extraction on the n data streams to obtain to-be-assessed feature vectors corresponding to the first type; and
    inputting the to-be-assessed feature vectors corresponding to the first type into the trained first QoE assessment model to perform the QoE assessment to obtain the first QoE assessment result.

3. The method according to claim 1,
    wherein the screening comprises:
    identifying the m data streams, and determining one or more application types to which the m data streams belong;
    correspondingly screening out, from the m data streams, data streams $M_1'$, $M_2'$, ..., and $M_t'$ corresponding to a target application type, wherein the target application type is any one of the one or more application types to which the m data streams belong;
    when a bandwidth utilization rate $U_i$ is greater than a first preset threshold, determining a time period corresponding to an average throughput that is greater than a first preset percentile and that is in the t average throughputs $W_1$, $W_2$, ..., and $W_t$ as a target time period, and determining a data stream in the data streams $M_1'$, $M_2'$, ..., and $M_t'$ corresponding to the target application type corresponding to the target time period as a data stream $M_i''$ corresponding to the first type, wherein i is a natural number, and 1≤i≤t;
    when the bandwidth utilization rate $U_i$ is less than or equal to the first preset threshold and greater than a second preset threshold, determining a time period corresponding to an average throughput that is greater than a second preset percentile and that is in the t average throughputs $W_1$, $W_2$, ..., and $W_t$ as the target time period, and determining the data stream in the data streams $M_1'$, $M_2'$, ..., and $M_t'$ corresponding to the target application type corresponding to the target time period as the data stream $M_i''$ corresponding to the first type; and
    when the bandwidth utilization rate $U_i$ is less than or equal to the second preset threshold, determining a time period corresponding to an average throughput that is greater than a third preset percentile in the t average throughputs $W_1$, $W_2$, ..., and $W_t$ as the target time period, and determining the data stream that is in the data streams $M_1'$, $M_2'$, ..., and $M_t'$ corresponding to the target application type corresponding to the target time period as the data stream $M_i''$ corresponding to the first type, wherein 0<the second preset threshold<the first preset threshold, and 0<the first preset percentile<the second preset percentile<the third preset percentile<100.

4. The method according to claim 1, wherein after the screening the m data streams, the method further comprises:
    determining that q data streams in the m data streams and that meet a second preset condition are data streams corresponding to a second type, wherein all data streams in the q data streams are different from data streams in the p data streams, q is a natural number greater than 0, and p+q≤m;
    performing feature extraction on the data streams corresponding to the second type to obtain known feature vectors corresponding to the second type;

training, by using the known feature vectors corresponding to the second type, an untrained second QoE assessment model to obtain a trained second QoE assessment model; and performing, by using the trained second QoE assessment model, QoE assessment on w data streams corresponding to the second type to obtain a second QoE assessment result, wherein the w data streams are data streams after the m data streams transmitted by the network device, and w is a natural number greater than 0.

5. The method according to claim 2, wherein the network device comprises at least one untrained one QoE assessment model, wherein each of the at least untrained one QoE assessment model is corresponding to one application type, wherein the untrained first QoE assessment model is any one of the at least one untrained QoE assessment model, and wherein the untrained first QoE assessment model is corresponding to a target application type.

6. A network device, comprising:
a processor,
a communications interface configured to receive or send data, and
a memory coupled to the processor to store instructions, which when executed by the processor, cause the processor to perform operations, the operations comprising:
obtaining m data streams transmitted by the network device, and m is a natural number greater than 1, wherein the m data streams are data streams $M_1$, $M_2$, . . . , and $M_t$ transmitted by the network device within t time periods, wherein t is a natural number greater than 1;
obtaining t bandwidth utilization rates $U_1$, $U_2$, . . . , and $U_t$ corresponding to the t time periods, t average throughputs $W_1$, $W_2$, . . . , and $W_t$ corresponding to the t time periods, and percentiles corresponding to the t average throughputs $W_1$, $W_2$, . . . , and $W_t$;
screening the m data streams, and determining that p data streams that are in the m data streams and that meet a first preset condition are data streams corresponding to a first type, wherein p is a natural number greater than 0;
performing feature extraction on the data streams corresponding to the first type to obtain known feature vectors corresponding to the first type;
training, by using the known feature vectors corresponding to the first type, an untrained first quality of experience (QoE) assessment model to obtain a trained first QoE assessment model; and
performing, by using the trained first QoE assessment model, QoE assessment on n data streams corresponding to the first type to obtain a first QoE assessment result, wherein the n data streams are data streams after the m data streams transmitted by the network device, and n is a natural number greater than 0.

7. The network device of claim 6, wherein the performing QoE assessment on n data streams comprises:
performing feature extraction on the n data streams to obtain to-be-assessed feature vectors corresponding to the first type; and
inputting the to-be-assessed feature vectors corresponding to the first type into the trained first QoE assessment model to perform the QoE assessment to obtain the first QoE assessment result.

8. The network device of claim 6,
wherein the screening comprises:
identifying the m data streams, and determining one or more application types to which the m data streams belong;
correspondingly screening out, from the m data streams, data streams $M_1'$, $M_2'$, . . . , and $M_t'$ corresponding to a target application type, wherein the target application type is any one of the one or more application types to which the m data streams belong;
when a bandwidth utilization rate $U_i$ is greater than a first preset threshold, determining a time period corresponding to an average throughput that is greater than a first preset percentile and that is in the t average throughputs $W_1$, $W_2$, . . . , and $W_t$ as a target time period, and determining a data stream in the data streams $M_1'$, $M_2'$, . . . , and $M_t'$ corresponding to the target application type corresponding to the target time period as a data stream $M_i''$ corresponding to the first type, wherein i is a natural number, and $1 \leq i \leq t$;
when the bandwidth utilization rate $U_i$ is less than or equal to the first preset threshold and greater than a second preset threshold, determining a time period corresponding to an average throughput that is greater than a second preset percentile and that is in the t average throughputs $W_1$, $W_2$, . . . , and $W_t$ as the target time period, and determining the data stream in the data streams $M_1'$, $M_2'$, . . . , and $M_t'$ corresponding to the target application type corresponding to the target time period as the data stream $M_i''$ corresponding to the first type; and
when the bandwidth utilization rate $U_i$ is less than or equal to the second preset threshold, determining a time period corresponding to an average throughput that is greater than a third preset percentile in the t average throughputs $W_1$, $W_2$, . . . , and $W_t$ as the target time period, and determining the data stream that is in the data streams $M_1'$, $M_2'$, . . . , and $M_t'$ corresponding to the target application type corresponding to the target time period as the data stream $M_i'$ corresponding to the first type, wherein 0<the second preset threshold<the first preset threshold, and 0<the first preset percentile<the second preset percentile<the third preset percentile<100.

9. The network device of claim 6, wherein after the screening the m data streams, the method further comprises:
determining that q data streams in the m data streams and that meet a second preset condition are data streams corresponding to a second type, wherein all data streams in the q data streams are different from data streams in the p data streams, q is a natural number greater than 0, and $p+q \leq m$;
performing feature extraction on the data streams corresponding to the second type to obtain known feature vectors corresponding to the second type;
training, by using the known feature vectors corresponding to the second type, an untrained second QoE assessment model to obtain a trained second QoE assessment model; and
performing, by using the trained second QoE assessment model, QoE assessment on w data streams corresponding to the second type to obtain a second QoE assessment result, wherein the w data streams are data streams after the m data streams transmitted by the network device, and w is a natural number greater than 0.

10. The network device of claim 7, wherein the network device comprises at least one untrained one QoE assessment model, wherein each of the at least untrained one QoE assessment model is corresponding to one application type, wherein the untrained first QoE assessment model is any one of the at least one untrained QoE assessment model, and wherein the untrained first QoE assessment model is corresponding to a target application type.

11. A non-transitory machine-readable storage medium having instructions stored therein, which when executed by a processor, cause the processor to perform operations, the operations comprising:
- obtaining m data streams transmitted by a network device, and m is a natural number greater than 1, wherein the m data streams are data streams $M_1, M_2, \ldots,$ and $M_t$ transmitted by the network device within t time periods, wherein t is a natural number greater than 1;
- obtaining t bandwidth utilization rates $U_1, U_2, \ldots,$ and $U_t$ corresponding to the t time periods, t average throughputs $W_1, W_2, \ldots,$ and $W_t$ corresponding to the t time periods, and percentiles corresponding to the t average throughputs $W_1, W_2, \ldots,$ and $W_t$;
- screening the m data streams, and determining that p data streams that are in the m data streams and that meet a first preset condition are data streams corresponding to a first type, wherein p is a natural number greater than 0;
- performing feature extraction on the data streams corresponding to the first type to obtain known feature vectors corresponding to the first type;
- training, by using the known feature vectors corresponding to the first type, an untrained first quality of experience (QoE) assessment model to obtain a trained first QoE assessment model; and
- performing, by using the trained first QoE assessment model, QoE assessment on n data streams corresponding to the first type to obtain a first QoE assessment result, wherein the n data streams are data streams after the m data streams transmitted by the network device, and n is a natural number greater than 0.

12. The machine-readable medium of claim 11, wherein the performing QoE assessment on n data streams comprises:
- performing feature extraction on the n data streams to obtain to-be-assessed feature vectors corresponding to the first type; and
- inputting the to-be-assessed feature vectors corresponding to the first type into the trained first QoE assessment model to perform the QoE assessment to obtain the first QoE assessment result.

13. The machine-readable medium of claim 11,
wherein the screening comprises:
- identifying the m data streams, and determining one or more application types to which the m data streams belong;
- correspondingly screening out, from the m data streams, data streams $M_1', M_2', \ldots,$ and $M_t'$ corresponding to a target application type, wherein the target application type is any one of the one or more application types to which the m data streams belong;
- when a bandwidth utilization rate $U_i$ is greater than a first preset threshold, determining a time period corresponding to an average throughput that is greater than a first preset percentile and that is in the t average throughputs $W_1, W_2, \ldots,$ and $W_t$ as a target time period, and determining a data stream in the data streams $M_1', M_2', \ldots,$ and $M_t'$ corresponding to the target application type corresponding to the target time period as a data stream $M_i''$ corresponding to the first type, wherein i is a natural number, and $1 \le i \le t$;
- when the bandwidth utilization rate $U_i$ is less than or equal to the first preset threshold and greater than a second preset threshold, determining a time period corresponding to an average throughput that is greater than a second preset percentile and that is in the t average throughputs $W_1, W_2, \ldots,$ and $W_t$ as the target time period, and determining the data stream in the data streams $M_1', M_2', \ldots,$ and $M_t'$ corresponding to the target application type corresponding to the target time period as the data stream $M_i''$ corresponding to the first type; and
- when the bandwidth utilization rate $U_i$ is less than or equal to the second preset threshold, determining a time period corresponding to an average throughput that is greater than a third preset percentile in the t average throughputs $W_1, W_2, \ldots,$ and $W_t$ as the target time period, and determining the data stream that is in the data streams $M_1', M_2', \ldots,$ and $M_t'$ corresponding to the target application type corresponding to the target time period as the data stream $M_i''$ corresponding to the first type, wherein
  0<the second preset threshold<the first preset threshold, and 0<the first preset percentile<the second preset percentile<the third preset percentile<100.

14. The machine-readable medium of claim 11, wherein after the screening the m data streams, the method further comprises:
- determining that q data streams in the m data streams and that meet a second preset condition are data streams corresponding to a second type, wherein all data streams in the q data streams are different from data streams in the p data streams, q is a natural number greater than 0, and $p+q \le m$;
- performing feature extraction on the data streams corresponding to the second type to obtain known feature vectors corresponding to the second type;
- training, by using the known feature vectors corresponding to the second type, an untrained second QoE assessment model to obtain a trained second QoE assessment model; and
- performing, by using the trained second QoE assessment model, QoE assessment on w data streams corresponding to the second type to obtain a second QoE assessment result, wherein the w data streams are data streams after the m data streams transmitted by the network device, and w is a natural number greater than 0.

15. The machine-readable medium of claim 12, wherein the network device comprises at least one untrained one QoE assessment model, wherein each of the at least untrained one QoE assessment model is corresponding to one application type, wherein the untrained first QoE assessment model is any one of the at least one untrained QoE assessment model, and wherein the untrained first QoE assessment model is corresponding to a target application type.

* * * * *

UNITED STATES PATENT AND TRADEMARK OFFICE
CERTIFICATE OF CORRECTION

PATENT NO. : 11,489,904 B2
APPLICATION NO. : 17/320497
DATED : November 1, 2022
INVENTOR(S) : Jiaming Tian, Qingping Yang and Chuntao Wang It is certified that error appears in the above-identified patent and that said Letters Patent is hereby corrected as shown below:

In the Claims

In Claim 2, Column 24, Line 1-2, delete "wherein the performing poor QoE assessment" and insert --wherein the performing QoE assessment--.

Signed and Sealed this
Fourteenth Day of February, 2023

Katherine Kelly Vidal
*Director of the United States Patent and Trademark Office*